United States Patent
Brambilla et al.

(10) Patent No.: US 6,199,903 B1
(45) Date of Patent: Mar. 13, 2001

(54) METHOD FOR TRIGGERING A TWO-STAGE AIR BAG GAS GENERATOR

(75) Inventors: Luigi Brambilla, Böblingen; Manfred Müller, Deizisau; Harald Rudolf, Tübingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/293,764

(22) Filed: Apr. 19, 1999

(30) Foreign Application Priority Data

Apr. 17, 1998 (DE) ............................................... 198 16 989

(51) Int. Cl.$^7$ .................................................... B60R 21/32
(52) U.S. Cl. ...................... 280/735; 280/734; 280/728.1; 701/45
(58) Field of Search ............................... 701/45; 280/734, 280/735, 736, 742, 737, 728.1, 739, 732; 180/282

(56) References Cited

U.S. PATENT DOCUMENTS

| | | | |
|---|---|---|---|
| 5,021,678 | * 6/1991 | Diller | 307/10.1 |
| 5,158,323 | * 10/1992 | Yamamoto et al. | 280/734 |
| 5,396,424 | * 3/1995 | Moriyama et al. | 701/46 |
| 5,892,435 | * 4/1999 | Buchheim et al. | 340/438 |
| 5,983,148 | * 11/1999 | Bigi et al. | 701/45 |

FOREIGN PATENT DOCUMENTS

| | | |
|---|---|---|
| 27 45 620 | 4/1979 | (DE) . |
| 43 30 486 C2 | 3/1995 | (DE) . |
| 195 41 584 A1 | 5/1997 | (DE) . |
| 0 458 796 B2 | 12/1991 | (EP) . |
| 7-165004 | 6/1995 | (JP) . |
| 7-186879 | 7/1995 | (JP) . |
| 10-1020 | 1/1998 | (JP) . |
| 10-81197 | 3/1998 | (JP) . |
| 10-95305 | 4/1998 | (JP) . |
| 10-119711 | 5/1998 | (JP) . |
| WO 90/09298 | 8/1990 | (WO) . |
| WO 95/19278 | 7/1995 | (WO) . |

OTHER PUBLICATIONS

* cited by examiner

*Primary Examiner*—William A. Cuchlinski, Jr.
*Assistant Examiner*—Olga Hernandez
(74) *Attorney, Agent, or Firm*—Evenson, McKeown, Edwards & Lenahan, P.L.L.C.

(57) ABSTRACT

In a method for triggering a two-stage air bag generator in a motor vehicle, an acceleration signal is measured, processed and evaluated with respect to the accident severity according to a first evaluation process. As a function of the determined accident severity, a triggering decision is made at least for the triggering of a first stage of the gas generator. At least until a defined time period T1 has elapsed since the ignition of the first stage, the acceleration signal is evaluated according to a second evaluation process with respect to the accident severity before, on the basis of defined triggering conditions, as a function of the determined accident severity, a triggering decision is made for igniting the second stage of the gas generator.

22 Claims, 2 Drawing Sheets

METHOD FOR TRIGGERING A TWO-STAGE AIR BAG GAS GENERATOR

This application claims the priority of 198 16 989.2, filed Apr. 17, 1998, the disclosure of which is expressly incorporated by reference herein.

BACKGROUND OF THE INVENTION

The invention relates to a method for triggering a two-stage air bag gas generator in a motor vehicle, and more particularly, to a method in which an acceleration signal is measured, processed and by way of a first evaluation process, a triggering decision is made for triggering the first stage of the gas generator and by way of a second evaluation process, a triggering decision is made for triggering the second stage of the gas generator. The triggering of the second stage is released only after elapse of a defined time period T1 since the ignition of the first stage.

Air bag triggering methods are generally well known. For the evaluation of the seriousness of an accident, for example, threshold values are used which when exceeded by working signals derived from the acceleration signal points to a certain seriousness of an accident. In particular, a method for triggering restraining devices is discussed in EP 0 458 796 B2, in which an acceleration signal is measured and is converted by an integration step into a data processing speed signal which approximately reflects the crash-caused speed reduction. For forming a triggering criterion for an air bag, a threshold value for the mentioned data processing speed signal can be defined. This threshold value, in turn, can be changed as a function of one or several state variables derived from the crash event, for example, as a function of the time elapsed in the crash. Furthermore, it is known to include safety-relevant state variables, such as the buckle switch state, the seat occupation by a person or a child seat, and the occupant position or the occupant weight, in the triggering conditions. The restraining devices are activated as a function of the recognized seriousness of the accident and the occupant condition.

Particularly in the combination of the belt tightener and the air bag, multi-stage restraining systems are known and are used in vehicles, in which, as a function of the seriousness of the accident and the occupant (whether or not the occupant is, for example, wearing a belt), the belt tightener and the air bag is are activated simultaneously, successively or selectively. Staggered triggering thresholds for the belt tightener and the air bag achieve, a triggering action which is graduated according to the seriousness of the accident.

In order to reduce the stressing of the occupant by an inflating air bag, two-stage or multi-stage gas generators are known for filling the air bag. The ignition of the second stage takes place in a time-staggered manner after the ignition of the first stage.

Two-stage gas generators of a first type have two separate gas generating systems with one separate igniter respectively as seen in DE 19541584 A1. A specific quantity of gas is generated in each stage. As only one stage, or both stages are successively ignited in a time-staggered manner, the generated gas quantity flow can be varied for filling the air bag and can be adapted to the seriousness of the accident.

A second type of two-stage gas generators has a single gas generating system with two igniters. After the first ignition, an after ignition can be caused into the expansion phase of the gas by the second igniter in order to accelerate the gas expansion and increase the gas quantity. The effect of the second ignition depends considerably on the point in time of the ignition. At the end of a gas expansion phase initiated by a first ignition, the effect of an after ignition is slight.

Analogously to the initially mentioned method with staggered triggering thresholds for the belt tightener and the air bag, a method for a two-stage gas generator can be employed whereby staggered triggering thresholds are defined for the ignition of the first and second stage. If, because of the evaluation of the acceleration signal, a particularly serious impact with high deceleration values is recognized, both stages are ignited rapidly following one another, which brings the air bag rapidly into a protective condition, as appropriate for the accident situation. However, disadvantages are inherent in this method as explained below.

In order to achieve a sufficiently fast triggering with respect to all relevant crash events, the threshold for the second stage would have to be selected so low that in less serious crash events, a decision to ignite to the second stage would be made very early measured as the result of the occupant's forward displacement. Because the second stage could also still have been ignited at a later point in time in order to bring the air bag into a protective condition, time is wasted which could be utilized for observing and evaluating the acceleration signal.

Particularly in the event of crashes of medium severity, a soft inflation of the air bag is desirable in order to reduce the stress to the occupant by an inflating air bag. This requires a controlling of the time difference between the first and the second stage which is a relevant parameter for influencing the inflating action of the air bag. The second stage must not be ignited too early but also not too late. On one hand, the limited modular stability of the gas generator requires that a minimum time period must be maintained between the ignition of the first and the second stage of the gas generator. On the other hand, however, an ignition must be prevented when the occupant's forward displacement has progressed so far that an ignition of the second stage may result in an injury.

The precise control of the time difference cannot be satisfactorily carried out for real crash sequences by the above-described known method with the staggered triggering threshold for the ignition of the first and second stage.

DE 27 45 620 A1 involves a method in which the evaluation process on which the triggering decision for the triggering of the second stage of the gas generator is based consists of the fact that the acceleration signal is compared with a threshold value. When the threshold value is exceeded, the triggering decision is made. However, a delay element causes the triggering of the second stage to be released only with the elapse of a defined time period from the ignition of the first stage. As a result, independently of the time sequence of the deceleration increase occurring in the event of an accident, the optimal time interval must be ensured between the triggering of the first and the second stage of the two-stage air bag system. The optimal time interval results from the demand that the optimal sound pressure occurring during the triggering is to be reduced. This method has the disadvantage that, in crash events which exhibit a very strong initial deceleration increase, the triggering decision to the second stage is made very early with the threshold being exceeded. The remaining time to the delayed triggering therefore elapses unutilized, which affects the evaluation concerning the seriousness of the accident. An evaluation of the entire course of the acceleration signal during the entire defined time period to the triggering could improve the evaluation with respect to the seriousness of the accident and thus the adaptation to the accident event.

WO95/19278 describes a multi-stage air bag system in which the various gas generators are triggered according to a triggering profile which, as a function of parameters which relate to the crash event and/or the occupant, determines the sequence and time sequence of the triggering of the gas generators. As a result, the inflating action of the multi-stage air bag system can be better adapted with respect to its restraining effect.

SUMMARY OF THE INVENTION

An object of the present invention is to provide a method for triggering a two-stage air bag generator, which, on the basis of the received acceleration signals of an acceleration sensor, makes a decision to ignite the second stage in a reliable manner and adapted to the seriousness of the accident, and permits a precise control of the time difference between triggering the first and the second stage.

This object has been achieved according to the present invention by providing that the second evaluation process, irrespective of the initial course of the acceleration signal, at least until the defined time period T1 has elapsed since the ignition of the first stage, first the whole course of the acceleration signal is evaluated with respect to the accident severity before, on the basis of defined triggering conditions, as a function of the determined accident severity, a triggering decision is made for triggering the second stage of the gas generator.

This new method has the advantage that the point in time of the triggering of the second stage can be adapted to the air bag generator used and can be selected such that the ignition of the second stage definitely does not take place earlier than allowed on account of the modular stability and not earlier than absolutely necessary. Thereby the resulting time period T1 gained is fully utilized for evaluating the acceleration signal and improves the reliability of the evaluation with respect to the seriousness of the accident.

The evaluation of the seriousness of the accident, which results in the decision concerning the triggering of the second stage, according to the invention is based on a classification of the crash event into a grid-type diagram of accident severity zones graduated according to the seriousness of the accident, such as a slight, a medium and a serious crash. In one embodiment, the acceleration signal, while a simple integration step is used, is processed to a data processing speed signal and is assigned to an accident severity zone in a speed-event space. The accident severity zones classify the crash event roughly according to the crash-caused speed reduction. As an alternative, for evaluating the seriousness of an accident, the time sequence of one or several working signal derived from the acceleration signal can be detected and, by way of a pattern recognition method by a comparison with stored ideal patterns, the crash event can be assigned to an accident severity zone.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
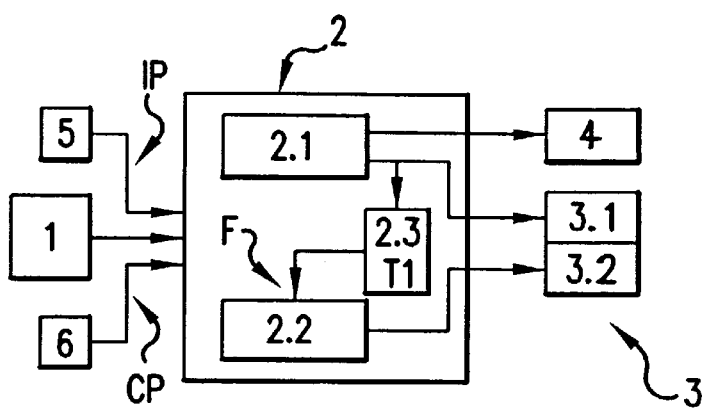
FIG. 1 is a block diagram of a safety device with a two-stage gas generator.

The block diagram illustrated in FIG. 1 shows a safety device with a multi-stage restraining system 3, 4 for a motor vehicle. The safety device comprises at least one acceleration sensor 1 which receives an impact-caused acceleration signal, a control unit 2 and the multi-stage restraining system 3, 4. The latter comprises at least one two-stage air bag gas generator 3 with an ignition stage 3.1 for the first air bag stage and an ignition stage 3.2 for the second air bag stage. Additional restraining components 4, such as belt tighteners, belt force limiting devices, side air bags, etc. may also be provided.

The signals of the sensor 1 are processed by the control unit 2 and are evaluated with respect to the seriousness of the accident according to a first evaluation process in a first evaluation stage 2.1, as a function of the determined accident severity, a triggering decision being made for the first stage 3.1 of the gas generator 3 and optionally for the additional restraining components 4, particularly a belt tightener. Like ted the initially described triggering method, the evaluating method can be constructed with graduated triggering thresholds for a belt tightener and the first air bag stage 3.1.

According to the invention, a second evaluating stage 2.2 is provided which evaluates the acceleration signal according to a second evaluating method which may be identical with the first evaluating method, but preferably is selected to be different, as illustrated by the following.

According to the present invention, a time function element 2.3 is provided which, triggered by an ignition signal for igniting the first stage 3.1 emits a release signal F to the second evaluating stage 2.2 only after a time period T1 has elapsed. When the release signal F is present, a triggering decision for igniting the second stage 3.2 is made on the basis of defined triggering conditions as a function of the determined accident severity.

In a preferred further development, the control unit 2 is additionally triggered by state variables IP (occupant parameters) of an occupant recognition system 5 which relate to the occupant to be protected. Such a typical state variable is the buckle switch state which indicates whether or not the occupant is wearing a seat belt. Furthermore, additional state variables, such as the occupant's size or weight, the occupant's position (out-of-position) and the sitting position or, if the occupant to be protected as a front seat passenger, the seat occupation state of the front passenger seat by an occupant or a child seat, may be used for the triggering.

Furthermore, the control unit 2 can be triggered by a crash parameter detection system 6 with a state variable CP related to the crash parameters. The state variable CP allows a conclusion with respect to the occurring or expected collision energy of the crash event. A corresponding state variable may be derived from the acceleration signal.

As one alternative, the crash parameter detection 6 can also be formed by deformation sensors which are situated on the outside; i.e. are arranged in the proximity of the vehicle body shell and which measure, for example, the intrusion speed, in which case a conclusion can be drawn from the deformation and the intrusion speed with respect to the collision energy. As another alternative, the crash parameter detection 6 can also be formed by a prevention or precrash sensor system which detects, for example, by radar measurements, the relative speed to the collision object shortly before the crash event. Based on a measured relative speed, in cases when the measured relative speed deviates significantly from the vehicle's own speed, a conclusion can be drawn that a vehicle is moving. On the basis of a typical vehicle mass, the kinetic energy of the colliding vehicle can be estimated.

In a simplified, but reasonably priced further development, instead of a measured relative speed to the collision object, the vehicle's own speed can be fed as a state variable CP characterizing the collision energy in order to dynamically adapt the time period T1 to the crash event. Although the vehicle's own speed coincides with the relative speed only for static collision objects and is therefore generally not a suitable parameter for characterizing the crash event, in the case of crashes with an oncoming vehicle, the vehicle's own speed nevertheless forms a lower limit for the relative speed. On the whole, the vehicle's own speed can therefore be used for coordinating the triggering sensitivity for the second stage to a crash such that a triggering behavior occurs which is as optimal as possible for an impact at the own speed or a higher relative speed.

In collisions, the relative speed is always lower than the vehicle's own speed, so that here an increase of the triggering sensitivity caused by the fed vehicle's own speed would represent no meaningful adaptation to the crash event, particularly when the relative speed is much lower than the vehicle's own speed. Such a crash event, that is, a collision with a vehicle which drives ahead at a slightly slower speed, however, as a rule, does not even result in a triggering of the first stage of the gas generator. For influencing the triggering of the second stage, which, because of the preceding triggering of the first stage, is always preceded by an evaluation with respect to the occurring acceleration and thus of the collision energy, a feeding of the vehicle's own speed as a state variable characterizing the collision energy therefore makes sense and improves the overall behavior.

The state variables relating to the occupant or to the crash parameters can influence the defined time period T1, the evaluating method for determining the severity of the accident as well as triggering conditions, which link the determined accident severity with triggering decisions.

When calculating T1, an optimum must be found between an observation time which is as long as possible, on the one hand, and the risk of injury to be minimized, on the other hand. A lower limit T1min for the time period T1 is in this case formed by that time difference between the first and the second ignition which just barely still permits a taut filling of the air bag within filling times of typically 40 msec required for serious crashes with high deceleration values. An upper limit T1max for the time period T1 is caused by the occupant's forward displacement which, in the case of the ignition of the second stage, must not have progressed too far in order to minimize the risk of injury.

Within these limits, the time period T1 can be firmly selected adapted to the specific gas generator. When the initially described first type of gas generators is used and when the gas quantity which can be generated is distributed by halves to the two chambers, a suitable value of T1=15–18 msec. is obtained for the time period T1. After half the filling time of approximately 15–18 msec, the air bag is already inflated but not yet taut.

A further development is also conceivable in the case of which the time period T1 is dynamically adapted to the real crash event within the above-indicated lower and upper limits. The adaptation takes place as a function of a state variable influenced by the crash event, particularly the above-indicated state variable CP relative to the crash parameters. This allows a conclusion on the occurring or expected collision energy of the crash event, in which the time period T1 is shifted toward the lower limit T1min when the state variable indicates a high collision energy, whereby a fast triggering is achieved.

In a simplified but reasonably priced further development, as mentioned above, the vehicle's own speed can be fed as a state variable characterizing the collision energy in order to dynamically adapt the time period T1 to the crash event.

In order to prevent an ignition of the second stage which is too late, the second ignition can only take place at the point in time which is defined by the ignition of the first stage plus the time period T1. This is a marginal case of the more general further development that an ignition according to the defined triggering conditions can only take place within a time interval T1 to T1+DT determined by a time window DT. If, during the time period T1, no serious accident is indicated which requires an immediate ignition of the second stage, this means simultaneously that the forward displacement-also takes place more slowly, so that the second stage may also still be ignited a little later, without any increase of the risk of injury. This applies even more to generators of the second type with only one gas generating system, in which the effect of the second ignition decreases with an increasing time difference. As an alternative, it may be provided that, after elapse of the time period T1+DT, instead of a complete suppression of any triggering of the second stage, a triggering can take place according to special triggering conditions.

Because the optimal ignition point in time is generally dependent on the occupant's position relative to the air bag, a further development is advantageous in the case of the which the time period T1 or the time window DT is dynamically and relative to the occupant adapted to the real crash event. This can take place, for example, by an algorithm which determines the point in time at which a state variable for the occupant's forward displacement derived by a two-time integration from the acceleration signal exceeds a defined limit value. The thus determined point in time represents an absolute time limit which must not be exceeded by the time T1+DT from the ignition of the first stage. Further details of such a method for desensitizing the triggering sensitivity are described in DE 43 30 486 A1.

Alternatively, the triggering of the air bag is influenced by an occupant's position recognition, particularly an out-of-position recognition. Relative to the triggering of the second air bag stage, it is then advantageous to control the definition of the time period T1 or of the time window DT as a function of an occupant's position recognition such that a triggering of the second stage is prevented when the forward displacement has progressed too far.

Figure 2:
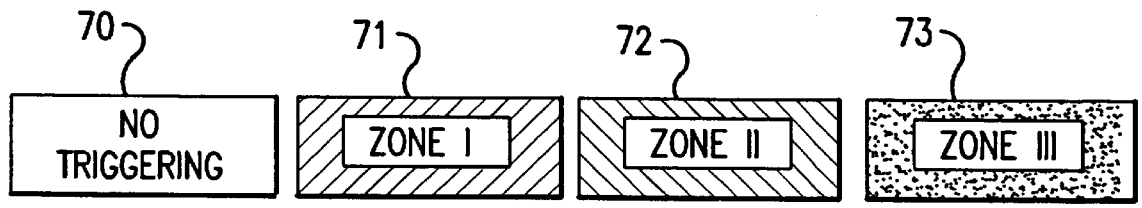
FIG. 2 is a view of the classification of crash events into accident severity zones.

The second evaluating method, which is carried out by the evaluating stage 2.2 and decides on the triggering of the second stage, according to the invention, is based on a classification of the crash event into a grid-type diagram of accident severity zones graduated according to the seriousness of the accident. As illustrated in FIG. 2. For determining the triggering of the second air bag stage, the crash events are divided into a total of 4 accident severity zones Z0 to Z3. These accident severity zones are an image of the seriousness of the accident, such as a slight, medium and serious crash and correspond roughly to the speed reduction during the crash.

A necessary triggering condition for the ignition of the second stage consists of the fact that the crash event was assigned to a certain accident severity zone. Zone Z0 corresponds to a very slight crash which is to result in no triggering; i.e., neither a triggering of the first nor of the second stage. Typical crash events which fall into this zone are, for example, a collision with a 40% offset at less than 15 km/h. The additional zones can be formed in a similar manner in that typical crash events are assigned to them.

Zone I Z1 comprises slighter crashes with a triggering of at most the first air bag stage, for example, a diagonal impact at 25 km/h and, in the transition to Zone II Z2, a frontal collision at 30 km/h. Zone II comprises medium crashes and, in the transition to Zone III, also frontal crashes at 50 km/h and, at least for an occupant not wearing a seat belt, leads to an ignition of the second air bag stage. Zone III comprises serious crashes, such as a frontal impact at more than 56 km/h and, irrespective of whether or not the driver is wearing a seat belt, leads to a triggering of the second air bag stage.

It is important for the method according to the present invention that the zone method is used exclusively for the triggering decision for the second stage. More specifically, this means that the zone method can be adapted and optimized with respect to those crash events which are above the threshold for triggering the first stage. A limitation of the zone without triggering Z0 to the first Zone Z1 can therefore be eliminated. Furthermore, it is important for the method according to the invention that, only after the time period T1 has elapsed, approximately 15–18 msec after the triggering of the first stage, the assignment of the crash event to an accident severity zone influences the triggering of the second stage.

While taking into account state variables which relate to the occupant or the crash parameters, as mentioned above, the zone boundaries can be shifted in the "triggering" or "non-triggering" direction, as explained in the following embodiment.

In the embodiment, within the scope of the second evaluating method, the individual accident severity zones are generated in a speed-event space (speed-time diagram) simultaneously with the crash-caused speed reduction DV as a function of the time t. The method is based on the arrangement that a slighter crash on average has lower acceleration values (deceleration values) than a serious crash. If, for reasons of simplicity, the typical accelerations are assumed to be constant for the crash duration, the pertaining speeds DV for the duration of the crash occur as linearly decreasing functions of the time. For the mutual delimitation of the accident severity zones, it is therefore meaningful to image the zone limits not as thresholds but as decreasing straight lines in the speed-event space.

Figure 3:
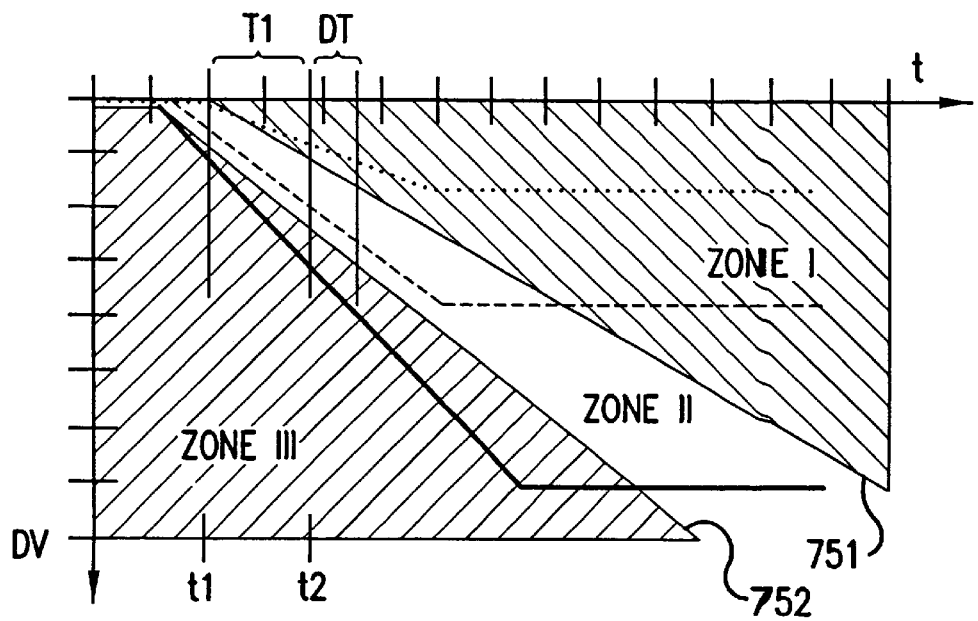
FIG. 3 is a view of the generating of accident severity zones in the speed—event space.

In FIG. 3, the zone limits ZS1 and ZS2, which delimit the three accident severity zones Z1, Z2, Z3 from one another, are shown as boundary straight lines. These boundary straight lines Y=mX+b can be calculated and generated by indicating the slope m and the axis section b in real time or can be accumulated in a variable so that they are available during the zone query. Generally, the zone limits in the speed-even space can naturally also be generated by suitable non-linear functions.

For the evaluation with respect to the accident severity, the measured acceleration signal is processed to a DV speed signal while using a simple integration. In FIG. 3, three typical DV speed signals are illustrated as a function of the time t, which were calculated on the basis of constant acceleration values representing typical crash events. The solid line corresponds to a severe crash; the broken line corresponds to a medium crash; and the dotted line corresponds to a slight crash. The typical speed reductions of real crash events show a qualitatively similar behavior.

The evaluation process according to the invention is explained in FIG. 3. If the triggering of the first stage takes place at the point in time t1, after the time period T1 has elapsed, it is examined at the point in time t2 in which accident severity zone the determined DV signal is situated. Generally, a necessary triggering condition for the ignition of the second stage will consist of the fact that the determined DV signal is situated within a certain accident severity zone. If, for example, at the point in time t1, the DV signal is in Zone I Z1, a slight crash exists and the second stage is not triggered because this is not desirable for this accident severity and is therefore not intended in this manner.

If the DV signal is in Zone II Z2, this is a necessary condition for a triggering of the second stage. Whether a triggering does in fact take place may be made dependent on additional triggering conditions, for example, whether or not the occupant is wearing a seat belt. According to the embodiment, as illustrated above, the observation and evaluation can be continued within a time window DT after the point in time t2, and a triggering decision can also still be made within this time window at the point in time at which all required triggering conditions have been met. The representation in FIG. 3 shows clearly that, after the elapse of the time limit T1, the different typical crash events in the speed-event space can easily be differentiated from one another.

The setting-up of the zone limits, which, according to a given function, are generated as the function of time in the speed—event space, is started by a triggering signal which is caused by the crash event. The setting-up of the zones should take place at a point in time which is as early as possible in order to ensure a sufficient separation between the individual crash types. It is therefore advantageous for the triggering signal to be set when an acceleration threshold (alert threshold) is exceeded because such a criterion has a fast reaction. Alternatively, the triggering signal may be set when a restraining device is triggered which is always triggered before the ignition of the second stage, particularly a belt tightener or the first stage of the gas generator.

In order to better adapt the triggering behavior to the crash event and to the occupant, it is advantageous to change the triggering conditions or the zone limits which determine the accident severity zones as a function of the state variables IP, CP which relate to the occupant to be protected or to crash parameters. The state variables IP which relate to the occupant were described in conjunction with the occupant recognition 5 in FIG. 1. The state variables CP which relate to the crash parameters were explained at the same point in conjunction with the crash parameter detection 6.

Figure 4:
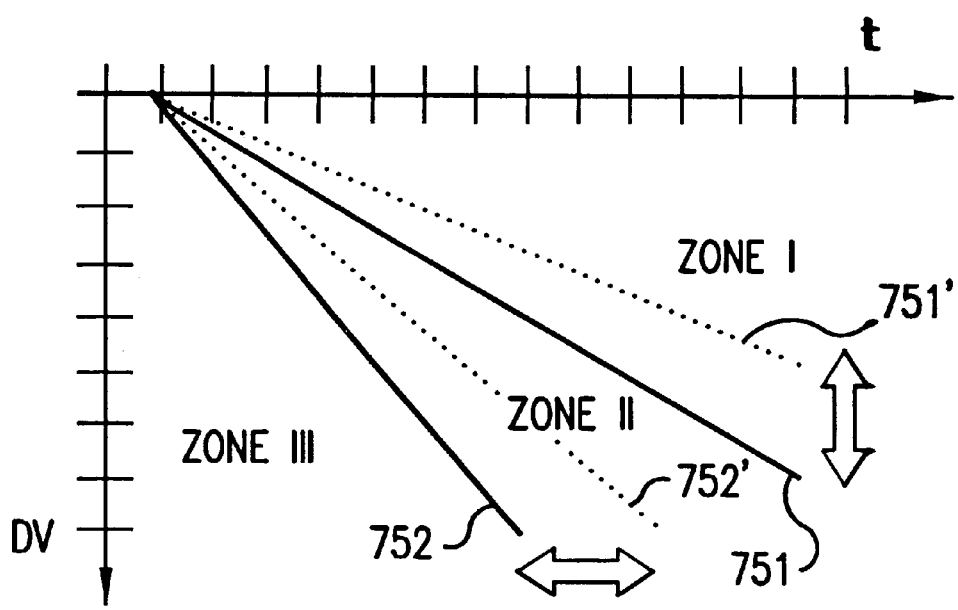
FIG. 4 is a view of the displacement of the zone limits as a function of the occupant's weight.

FIG. 4 illustrates how the accident severity zones in the speed-event space are shifted or turned as a function of the occupant weight. The broken lines corresponds to the zone limits Zs1', ZS2' for a heavy occupant, and the solid line corresponds to the zone limits ZS1, ZS2 for a light occupant. As a function of the determined weight of the seat occupation, the zone limits are therefore shifted such that a triggering of the second stage is promoted with an increasing weight. The reason is that, in the case of the same accident severity, light occupants often require only the first air bag stage. Expediently, a division into weight classes takes place, for example, four classes on the driver side and five classes on the front passenger side. The lowest weight class on the front passenger side is used for switching off the front passenger air bag. The class which follows includes a large number of child seats which can be strapped to the seat, in which, for reasons of safety, the switching-off of the front passenger air bag is controlled by a child seat recognition system which is known per se, for example, by way of a transponder in the child seat which can be queried.

Correspondingly, the accident severity zones can also be controlled as a function of a state variable CP relating to crash parameters, particularly a state variable which allows a conclusion on the collision energy to be expected or occurring. As indicated in conjunction with an influencing of the time period T1, for the purposes of the triggering of the second air bag stage, the own speed of the vehicle can be used as such a state variable which characterizes the collision energy, because the vehicle's own speed is used only as additional information. In the event of a crash at high speeds, particularly in certain occupant weight classes, a triggering of the 2nd air bag stage is to be promoted which would extend more in the boundary area of the zones.

Figure 5:
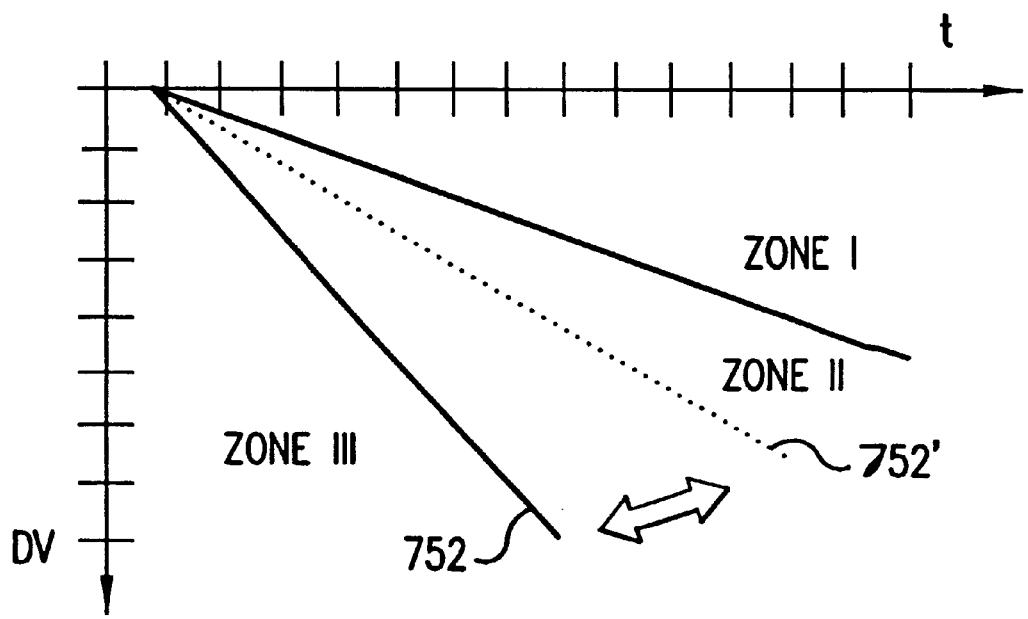
FIG. 5 is a view of the displacement of the zone limits as a function of the relative speed in a crash event or at the vehicle's own speed.

FIG. 5 shows how the zone limits in the speed-event space are shifted or turned as a function of the own speed of the vehicle. Only the lower zone limit ZS2 is turned in the direction of the time axis in order to enlarge the Zone III which always causes a triggering of the second stage. The turning of the straight line takes place in three stages, as a function of the speed range of three speed ranges BV1, BV2, BV3 into which the own speed falls. A suitable graduation is obtained by a range selection BV1<30 km/h (initial setting), BV2=30–50 km/h (increased sensitivity), BV3>50 km/h (full sensitivity). Generally, the zone limits are shifted in that a triggering of the second stage is promoted with an increasing inherent speed or collision energy, in which this shifting can also in addition be controlled as a function of the occupant's weight.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for triggering a two-stage air bag gas generator in a motor vehicle, comprising the steps of measuring and processing an acceleration signal;
    with a first evaluation process, making a triggering decision for triggering the first stage of the gas generator and
    with a second evaluation process, making a triggering decision for triggering the second stage of the gas generator, and
    releasing the triggering of the second stage only after elapse of a defined time period T1 since the ignition of the first stage, wherein the second evaluation process, irrespective of the initial course of the acceleration signal, at least until the defined time period T1 has elapsed since the ignition of the first stage, first the whole course of the acceleration signal is evaluated with respect to the accident severity before, on the basis of defined triggering conditions, as a function of the determined accident severity, a triggering decision is made for triggering the second stage of the gas generator.

2. The method according to claim 1, wherein the time period, T1, within a range T1min to T1max, as a function of a state variable which relates to the crash parameters and which allows a conclusion on the occurring or expected collision energy of the crash event, is changed such that the time period T1 is shifted toward the lower limit, T1min, when the state variable shows a high collision energy.

3. The method according to claim 1, wherein when a triggering decision is made for the ignition of the second stage of the gas generator, the own vehicle speed is included as a state variable, which allows a conclusion with respect to the occurring or expected collision energy of the crash event.

4. The method according to claim 3, wherein the time period, T1, within a range T1min to T1max, as a function of a state variable which relates to the crash parameters and which allows a conclusion on the occurring or expected collision energy of the crash event, is changed such that the time period T1 is shifted toward the lower limit, T1min, when the state variable shows a high collision energy.

5. The method according to claim 4, wherein at least one of the triggering conditions and the zone limits, which determine the accident severity zones, are influenced as a function of a state variable related to the occupant or as a function of a state variable related to the crash parameters, which allows a conclusion with respect to the occurring or expected collision energy of the crash event.

6. The method according to claim 5, wherein the zone limits, as a function of a state variable related to the crash parameters, which allows a conclusion with respect to the occurring or expected collision energy of the crash event, is shifted such that, as the collision energy increases, a triggering of the second stage is promoted.

7. The method according to claim 1, wherein only at the point in time, T1, or within a time interval, T1 to T1+DT, determined by a time window, DT, since the ignition of the first stage, an ignition of the second stage takes place according to the defined triggering conditions.

8. The method according to claim 7, wherein the time period, T1, within a range T1min to T1max, as a function of a state variable which relates to the crash parameters and which allows a conclusion on the occurring or expected collision energy of the crash event, is changed such that the time period T1 is shifted toward the lower limit, T1min, when the state variable shows a high collision energy.

9. The method according to claim 7, wherein at least one of the time period, T1, and the time window DT, as a function of an occupant position recognition or of a state variable for the occupant forward displacement derived from the acceleration signal, is controlled such that a triggering of the second stage is prevented when an occupant's forward displacement has progressed too far.

10. The method according to claim 7, wherein when the time interval permitted for an ignition has elapsed and an ignition of the second stage has not taken place, the triggering conditions are changed.

11. The method according to claim 10, wherein at least one of the time period, T1, and the time window DT, as a function of an occupant position recognition or of a state variable for the occupant forward displacement derived from the acceleration signal, is controlled such that a triggering of the second stage is prevented when an occupant's forward displacement has progressed too far.

12. The method according to claim 7, wherein when the time interval permitted for an ignition has elapsed and an ignition of the second stage has not occurred, the second stage is not ignited.

13. The method according to claim 12, wherein at least one of the time period, T1, and the time window DT, as a function of an occupant position recognition or of a state variable for the occupant forward displacement derived from the acceleration signal, is controlled such that a triggering of the second stage is prevented when an occupant's forward displacement has progressed too far.

14. The method according to claim 1, wherein with the second evaluation process, generally the crash event is classified into a grid-type diagram of accident severity zones graduated according to the accident severity, and a necessary triggering condition for the ignition of the second stage consists of the fact that the crash event was assigned to a certain accident severity zone.

15. The method according to claim 14, wherein with the second evaluation process, the acceleration signal is processed to a DV speed signal while using an integration step, which DV speed signal is compared with time-variable zone limits and is thus assigned to an accident severity zone in a speed-event space, a necessary triggering condition for the ignition of the second stage consisting of the DV signal being situated within a defined accident severity zone.

16. The method according to claim 15, wherein the zone limits form curves in the speed-event space which are generated according to a defined function dependent on the time, and the generation of the zone limits is started by a triggering signal which is caused by a crash event.

17. The method according to claim 16, wherein the triggering signal is set by the acceleration signal when an acceleration threshold is exceeded.

18. The method according to claim 16, wherein the triggering signal is set when a restraining device is triggered which is always triggered before the ignition of the second stage, including a belt tightener, a belt force limiting device or the first stage of the gas generator.

19. The method according to claim 14, wherein at least one of the triggering conditions and the zone limits, which determine the accident severity zones, are influenced as a function of a state variable related to the occupant or as a function of a state variable related to the crash parameters, which allows a conclusion with respect to the occurring or expected collision energy of the crash event.

20. The method according to claim 19, wherein the zone limits, as a function of a state variable related to the crash parameters, which allows a conclusion with respect to the occurring or expected collision energy of the crash event, is shifted such that, as the collision energy increases, a triggering of the second stage is promoted.

21. The method according to claim 19, wherein as a function of the determined weight of the seat occupation, the zone limits are shifted such that a triggering of the second stage is provided as the weight increases.

22. The method according to claim 20, wherein as a function of the determined weight of the seat occupation, the zone limits are shifted such that a triggering of the second stage is provided as the weight increases.

* * * * *